(12) United States Patent
Lee

(10) Patent No.: US 11,415,287 B2
(45) Date of Patent: Aug. 16, 2022

(54) LAMP FOR AUTOMOBILE AND AUTOMOBILE INCLUDING THE SAME

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/387,457

(22) Filed: Jul. 28, 2021

(65) Prior Publication Data

US 2022/0049830 A1    Feb. 17, 2022

(30) Foreign Application Priority Data

Aug. 13, 2020    (KR) .................. 10-2020-0102009

(51) Int. Cl.
*F21S 41/265* (2018.01)
*F21W 102/13* (2018.01)
*G02B 3/00* (2006.01)
*F21V 5/00* (2018.01)
*F21V 5/04* (2006.01)

(52) U.S. Cl.
CPC ............ *F21S 41/265* (2018.01); *F21V 5/004* (2013.01); *F21V 5/045* (2013.01); *F21W 2102/13* (2018.01); *G02B 3/0043* (2013.01); *G02B 3/0056* (2013.01); *G02B 3/0062* (2013.01)

(58) Field of Classification Search
CPC .. G02B 3/0043; G02B 3/0056; G02B 3/0062; F21V 5/045; F21V 5/004; F21S 41/265
See application file for complete search history.

(56) References Cited

U.S. PATENT DOCUMENTS

| 10,060,592 B2 * | 8/2018 | Yan .................... F21S 41/322 |
| 2007/0236921 A1 * | 10/2007 | Mosholder ........ F21V 23/0435 362/312 |
| 2007/0236950 A1 * | 10/2007 | Stefanov ............... F21S 41/265 362/496 |
| 2008/0247188 A1 * | 10/2008 | Woodward ............ F21S 41/25 362/326 |
| 2013/0010454 A1 * | 1/2013 | Takayama .............. F21V 5/045 362/84 |
| 2014/0218939 A1 * | 8/2014 | Hsu ....................... F21S 43/14 362/338 |

(Continued)

FOREIGN PATENT DOCUMENTS

| DE | 102006004587 A1 * | 8/2007 | .......... F21S 48/1154 |
| DE | 202017102935 U1 * | 8/2017 | .............. F21S 41/00 |

(Continued)

*Primary Examiner* — Colin J Cattanach
(74) *Attorney, Agent, or Firm* — NovoTechIP International PLLC

(57) ABSTRACT

A lamp for an automobile and the automobile are disclosed. According to one aspect of the present disclosure, disclosed is a lamp for an automobile, the lamp including: a light source configured to generate and emit light; and a lens array provided in front of the light source. The light, which has been emitted from the light source, is emitted to the outside via the lens array and forms a predetermined beam pattern, the lens array includes a plurality of cells provided in the front region of the lens array, and stepped portions are formed at boundaries between the plurality of cells.

11 Claims, 13 Drawing Sheets

(56) References Cited

U.S. PATENT DOCUMENTS

| | | | | |
|---|---|---|---|---|
| 2015/0078029 A1* | 3/2015 | Kumar | ................. | F21S 41/336 |
| | | | | 362/522 |
| 2016/0348869 A1* | 12/2016 | Williams | ................ | F21S 45/60 |
| 2017/0144589 A1* | 5/2017 | Jung | .................... | F21S 41/265 |
| 2018/0058661 A1* | 3/2018 | Shim | ........................ | G02B 3/08 |
| 2018/0356066 A1* | 12/2018 | Song | ........................ | F21V 5/04 |
| 2019/0120457 A1* | 4/2019 | Alisafaee | .............. | F21S 41/143 |

FOREIGN PATENT DOCUMENTS

| | | | | |
|---|---|---|---|---|
| DE | 202017104684 U1 * | 2/2018 | ............ | F21S 41/143 |
| DE | 202018002427 U1 * | 7/2018 | ............ | F21S 41/265 |
| EP | 3404313 A1 * | 11/2018 | ............ | F21S 41/141 |
| EP | 3608586 A1 * | 2/2020 | ............ | F21S 41/143 |
| WO | WO-2014207817 A1 * | 12/2014 | .......... | F21S 48/1159 |

\* cited by examiner

LAMP FOR AUTOMOBILE AND AUTOMOBILE INCLUDING THE SAME

CROSS-REFERENCE TO RELATED APPLICATIONS

This application claims priority from and the benefit of Korean Patent Application No. 10-2020-0102009, filed on Aug. 13, 2020, which is hereby incorporated by reference for all purposes as if set forth herein.

BACKGROUND OF THE INVENTION

1. Field of the Invention

Exemplary embodiments relate to a lamp for an automobile and an automobile including the lamp and, more specifically, to a lamp for an automobile utilizing a micro lens array and an automobile including the lamp.

2. Discussion of Related Art

Micro lens arrays including a plurality of micro lenses are widely used in fields of micro optics such as optical communication and direct optical imaging. Particularly, recent micro lens arrays are capable of forming a specific pattern on a road surface through an optical system having a size of about 10 mm, and thus have been used as a component that performs a welcome light function in an automobile.

According to the related art, a micro lens array has a structure in which a plurality of components including an entrance lens array, a shield, an exit lens array, and the like are sequentially stacked. However, this complicated stacking structure not only causes a difficulty in manufacture, but also causes a deterioration in the efficiency of a beam pattern because light is emitted after passing through the plurality of components.

BRIEF SUMMARY OF THE INVENTION

Exemplary embodiments of the present invention provide for improving productivity and efficiency of a beam pattern by simplifying a structure of a micro lens array mounted to an automobile when compared to the related art.

A first exemplary embodiment of the present invention provides a lamp for an automobile, the lamp including: a light source configured to generate and emit light; and a lens array provided in front of the light source, wherein the light, which has been emitted from the light source, is emitted externally via the lens array and forms a predetermined beam pattern, the lens array includes a plurality of cells provided in the front region of the lens array, and stepped portions are formed at boundaries between the plurality of cells.

Each of the plurality of cells may be provided in a first cell region provided in one region of the lens array or in a second cell region provided in the other region of the lens array, wherein light, emitted externally via the first cell region, among the light arrives at a central region and a peripheral region of the beam pattern in a left-right or horizontal direction (W), and light, emitted externally via the second cell region, among the light arrives at the central region of the beam pattern in the left-right direction (W).

The first cell region may be provided in a central region of the lens array in the left-right direction (W), and the second cell region may be provided in each of both side regions of the lens array in the left-right direction (W).

The cells, provided in the first cell region, among the plurality of cells may be provided such that thicknesses of the cells in a lower region are greater than thicknesses of the cells in an upper region.

Thicknesses of the cells, provided in the first cell region, among the plurality of cells may be greater than thicknesses of the cells provided in the second cell region.

When the lens array is viewed in front of the lens array, each of the plurality of cells may have a quadrangular shape.

When the lens array is viewed in front of the lens array, each of the plurality of cells may have a rectangular shape.

With respect to two arbitrary cells provided at the same height in an up-down or vertical direction (H) among the plurality of cells provided in the first cell region, an area of a region of the beam pattern, at which the light passing through the cell provided relatively close to the center of the lens array in the left-right direction (W) arrives, may be greater than an area of a region of the beam pattern, at which the light passing through the cell provided relatively away from the center of the lens array in the left-right direction (W) arrives.

With respect to two arbitrary cells provided at the same position in the left-right direction (W) among the plurality of cells provided in the first cell region, an area of a region of the beam pattern, at which the light passing through the cell provided at a relatively lower position in an up-down direction (H) arrives, may be greater than an area of a region of the beam pattern, at which the light passing through the cell provided at a relatively higher position in the up-down direction (H) arrives.

With respect to two arbitrary cells provided at the same height in an up-down direction (H) among the plurality of cells provided in the second cell region, an area of a region of the beam pattern, at which the light passing through the cell provided relatively close to the center of the lens array in the left-right direction (W) arrives, may be greater than an area of a region of the beam pattern, at which the light passing through the cell provided relatively away from the center of the lens array in the left-right direction (W) arrives.

With respect to two arbitrary cells provided at the same position in the left-right direction (W) among the plurality of cells provided in the second cell region, an area of a region of the beam pattern, at which the light passing through the cell provided at a relatively lower position in an up-down direction (H) arrives, is greater than an area of a region of the beam pattern, at which the light passing through the cell provided at a relatively higher position in the up-down direction (H) arrives.

The light passing through a plurality of cells, which are provided at both end portions of the lens array in the left-right direction (W), among the plurality of cells may arrive at an upper boundary region of the beam pattern.

The beam pattern may be a low beam pattern in which a cut-off shape is formed in an upper boundary region.

Cells, which are provided in the first cell region, among the plurality of cells may have greater thicknesses as provided close to the center of the lens array in the left-right direction (W).

A second exemplary embodiment of the present invention provides an automobile including a lamp for an automobile, wherein the lamp includes: a light source configured to generate and emit light; and a lens array provided in front of the light source, wherein the light, which has been emitted from the light source, is emitted externally via the lens array and forms a predetermined beam pattern, the lens array includes a plurality of cells provided in the front region of the lens array, and stepped portions are formed at boundaries between the plurality of cells.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE INVENTION

Hereinafter, a lamp for an automobile and the automobile according to the present disclosure will be described with reference to the drawings.

Lamp for automobile

Figure 1:
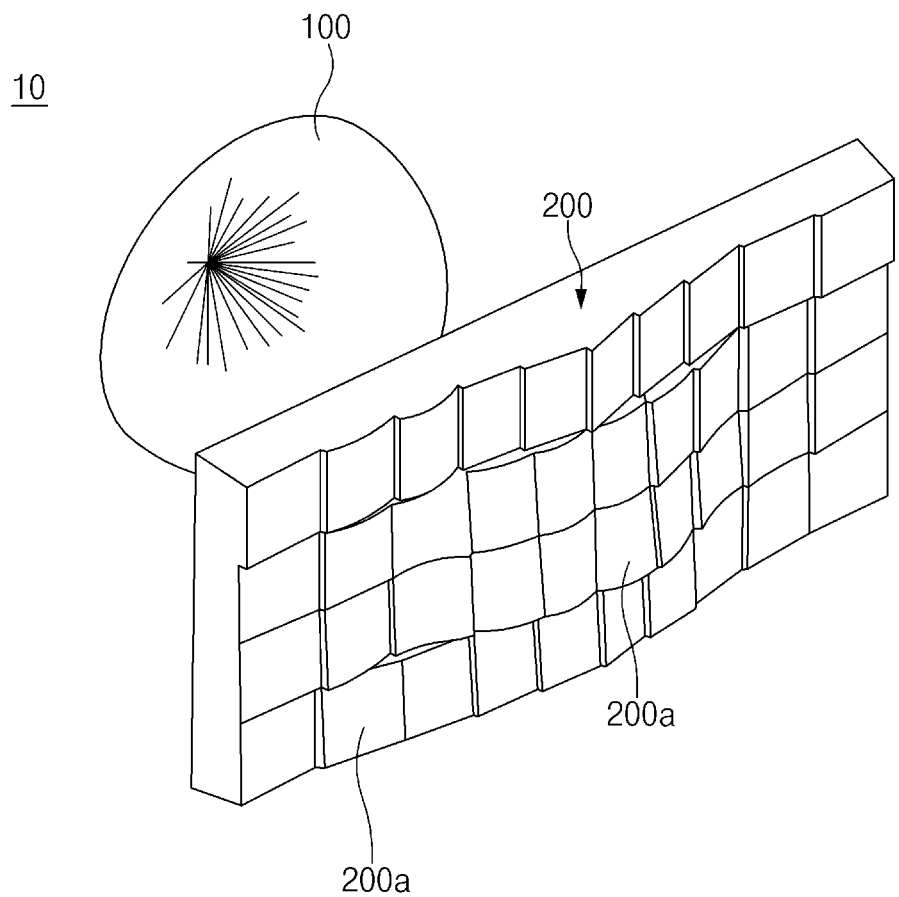
FIG. 1 is a perspective view illustrating a structure of a lamp for an automobile according to the present disclosure.
Figure 2:
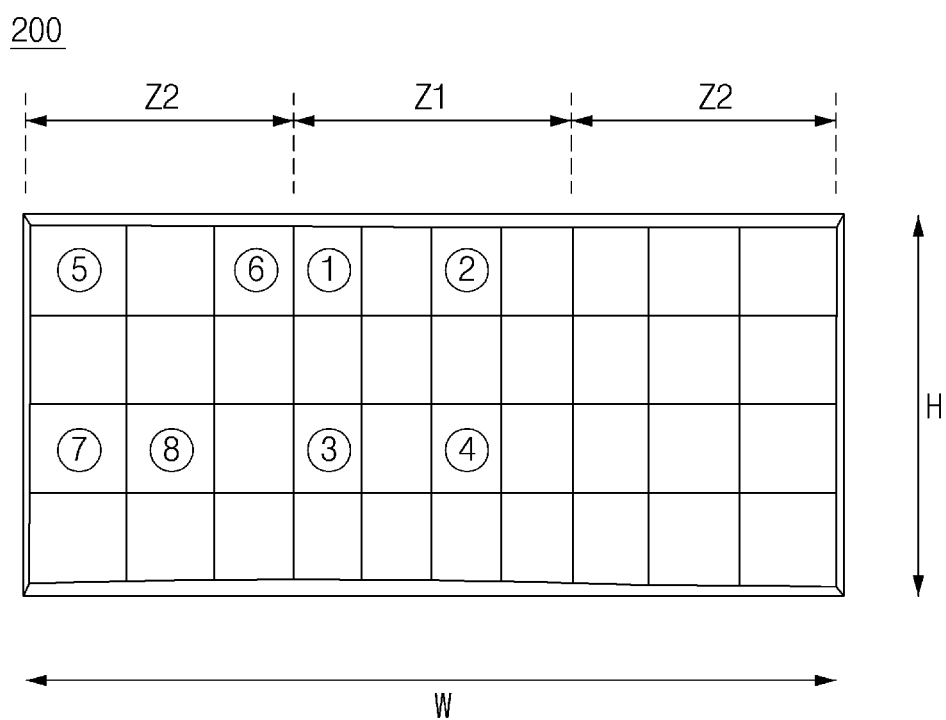
FIG. 2 is a front view illustrating a structure of a lens array provided in a lamp for an automobile according to the present disclosure.
Figure 3:
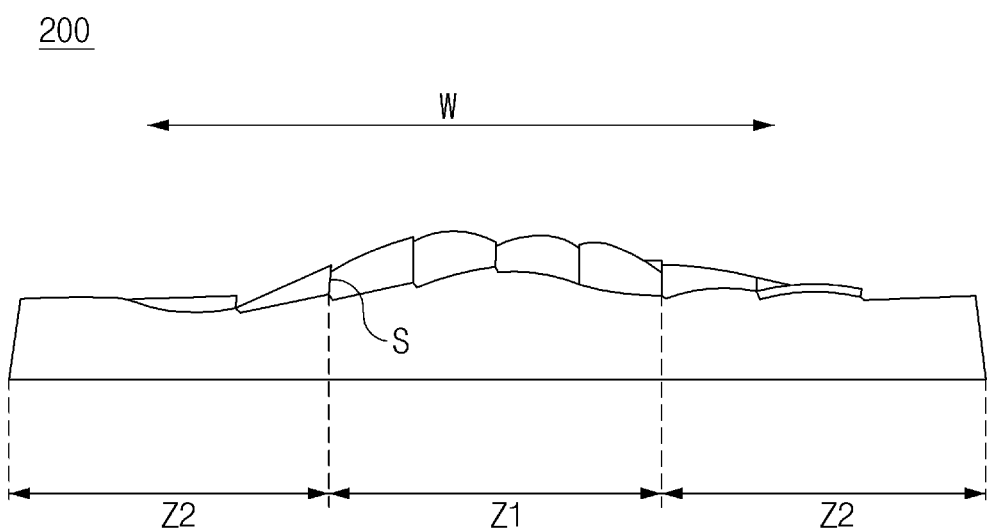
FIG. 3 is a bottom view illustrating a structure of a lens array provided in a lamp for an automobile according to the present disclosure.
Figure 4:
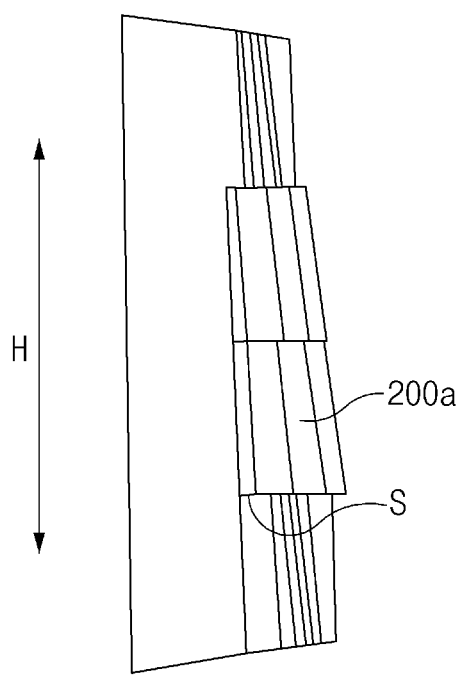
FIG. 4 is a side view illustrating a vertical cross-sectional structure of a first cell region in a lens array provided in a lamp for an automobile according to the present disclosure.

FIG. 1 is a perspective view illustrating a structure of a lamp for an automobile according to the present disclosure, and FIG. 2 is a front view illustrating a structure of a lens array provided in a lamp for an automobile according to the present disclosure. Also, FIG. 3 is a bottom view illustrating a structure of a lens array provided in a lamp for an automobile according to the present disclosure, and FIG. 4 is a side view illustrating a vertical cross-sectional structure of a first cell region in a lens array provided in a lamp for an automobile according to the present disclosure.

As illustrated in FIGS. 1 to 4, a lamp 10 for an automobile (hereinafter, referred to as a 'lamp') according to the present disclosure may include a light source (not shown) generating and emitting light, a collimator 100 provided in front of the light source, and a lens array 200 provided in front of the light source and the collimator 100. The light source may be a light-emitting diode (LED), but is not limited thereto. Also, the collimator 100 may be configured to make light, incident from the light source, parallel and then emit the parallel light to the lens array 200.

Figure 5:
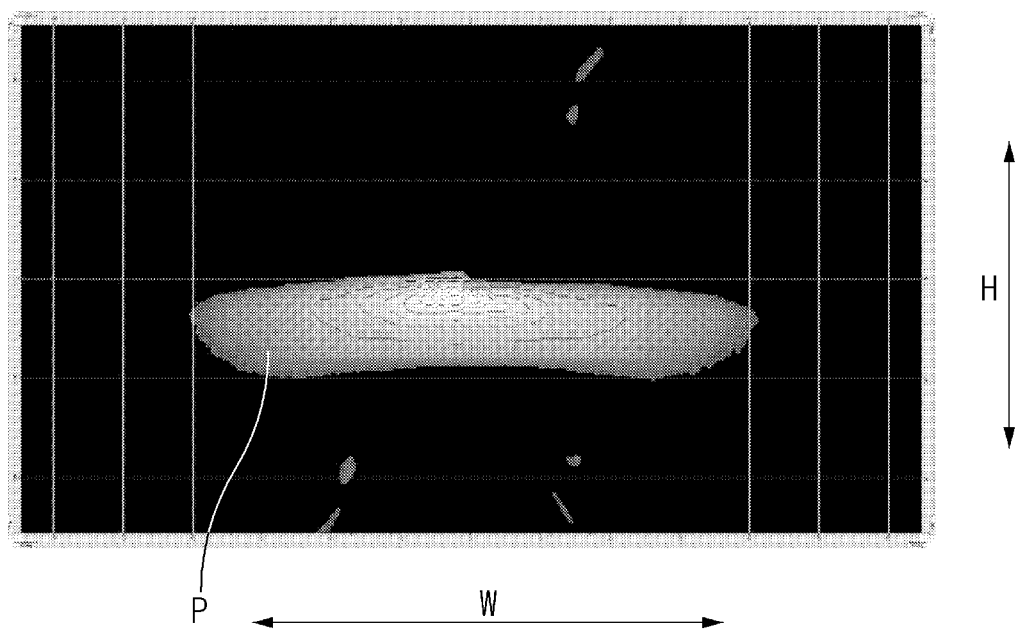
FIG. 5 is a view illustrating a shape of a beam pattern formed by a lamp for an automobile according to the present disclosure.

FIG. 5 is a view illustrating a shape of a beam pattern formed by a lamp for an automobile according to the present disclosure.

As illustrated in FIG. 5, the light, which has been emitted from the light source of the lamp 10 according to the present disclosure, is emitted externally via the collimator 100 and the lens array 200 and may form a predetermined beam pattern P. Here, as illustrated in FIG. 5, the beam pattern P may be a low beam pattern in which a cut-off shape having a stepped portion is formed in an upper boundary region. That is, the lamp 10 according to the present disclosure may be a lamp for forming the low beam. However, the lamp 10 according to the present disclosure may also be applied to a lamp for forming other types of beams including a high beam.

A micro lens array according to the related art has a structure in which a plurality of components including an entrance lens array, a shield, an exit lens array, and the like are sequentially stacked. However, this complicated stacking structure not only caused a difficulty in manufacture, but also caused a deterioration in the efficiency of a beam pattern because light was emitted after passing through the plurality of components.

In order to solve these limitations according to the related art, the lens array 200 provided in the lamp 10 according to the present disclosure may have a single layer structure made of one material. Thus, the present disclosure may have a simpler configuration than the micro lens array according to the related art. Hereinafter, features of the lens array according to the present disclosure will be described, which may form a predetermined beam pattern even though having a simpler structure than the micro lens array according to the related art.

As illustrated in FIG. 1, the lens array 200 according to the present disclosure may include a plurality of cells 200a provided in the front region of the lens array 200.

According to the present disclosure, the light, which has been emitted from the light source and passed through the collimator 100, passes through the plurality of cells 200a provided in the lens array 200 and then forms a predetermined beam pattern. Here, according to the present disclosure, each light, which is emitted externally after passing through the plurality of cells 200a, may form a portion of the beam pattern. That is, the beam pattern formed by the lamp 10 according to the present disclosure may be a set of light beams which are emitted from the plurality of respective cells 200a and then arrive at the outside. Also, the plurality of cells 200a provided in the lens array 200 according to the present disclosure may be integrally formed with each other.

Here, as illustrated in FIGS. 3 and 4, according to the present disclosure, stepped portions S may be formed at boundaries between the plurality of cells 200a. Thus, according to the present disclosure, the plurality of cells 200a may be distinguished from each other by the stepped portions S. FIGS. 1 to 4 illustrate, as one example, a state in which ten cells 200a are provided in the lens array 200 along a left-right, width or horizontal direction W while four cells 200a are provided along an up-down, height or vertical direction H. Thus, a total of 40 cells 200a are provided. However, the number and arrangement configuration of the cells 200a provided in the lens array 200 are not limited thereto. Here, the surface that forms a stepped portion S may have a curved surface with a predetermined radius of curvature.

Also, according to the present disclosure, when the lens array 200 is viewed in front of the lens array 200, each of the plurality of cells 200a may have a quadrangular shape. More preferably, when the lens array 200 is viewed in front of the lens array 200, each of the plurality of cells 200a may have a rectangular shape.

Here, according to the present disclosure, the lens array 200 may include a first cell region Z1 provided in one region of the lens array 200 and a second cell region Z2 provided in the other region of the lens array 200. Thus, each of the plurality of cells 200a provided in the lens array 200 may be provided in the first cell region Z1 or the second cell region Z2. More specifically, the first cell region Z1 may be provided in a central region of the lens array 200 in the left-right direction W, and the second cell region Z2 may be provided in each of both side regions of the lens array 200 in the left-right direction W. Thus, the second cell regions Z2 may surround the first cell region Z1 in both the side regions in the left-right direction W. More specifically, the boundaries of the first cell region Z1 in the left-right direction W may be in contact with the second cell regions Z2.

According to the present disclosure, with respect to the light emitted to the lens array 200 via the light source and the collimator 100, a region, at which the light emitted externally via the first cell region Z1 arrives, may be different from a region, at which the light emitted externally via the second cell region Z2 arrives. More specifically, as illustrated in FIG. 5, light, emitted externally via the first cell region Z1, among the light may arrive at a central region and a peripheral region of the beam pattern P in the left-right direction W, and light, emitted externally via the second cell region Z2, among the light may arrive at the central region of the beam pattern P in the left-right direction W. That is, according to the present disclosure, the light emitted externally via the second cell region Z2 may form the central region of the beam pattern P, and the light emitted externally via the first cell region Z1 may form the central region and the peripheral region of the beam pattern P.

Here, as illustrated in FIGS. 1 to 4, according to the present disclosure, thicknesses of the plurality of cells 200a constituting the lens array 200 may be different from each other according to the regions in which the cells 200a are provided.

As one example, among the plurality of cells 200a, the thicknesses of the cells 200a provided in the first cell region Z1 may be greater than the thicknesses of the cells 200a provided in the second cell region Z2. For example, as illustrated in FIG. 3, when the lens array 200 is viewed from the bottom, the boundary of the front region of the lens array 200 may have a shape similar to a normal distribution curve of which the center in the left-right direction W protrudes the furthest in a forward direction. More specifically, cells 200a, which are provided in the first cell region Z1, among the plurality of cells 200a may have greater thicknesses as provided close to the center of the lens array 200 in the left-right direction W.

Thus, according to the present disclosure, the light passing through the first cell region Z1 is emitted externally while being relatively diffused in the left-right direction W, and thus may arrive at the central region and the peripheral region of the beam pattern in the left-right direction W. However, the light passing through the second cell region Z2 is emitted externally while being relatively less diffused, and thus may arrive at the central region of the beam pattern in the left-right direction W.

As another example, according to the present disclosure, as illustrated in FIG. 4, the cells 200a, provided in the first cell region Z1, among the plurality of cells 200a may be provided such that thicknesses of the cells in a lower region are greater than thicknesses of the cells in an upper region in the up-down direction H. This may be to ensure that the light emitted from the lens array 200 is moved downward. That is, as described above, the lamp according to the present disclosure may be a lamp for forming a low beam, and thus, the light emitted from the lens array 200 is required to move downward in order to form the low beam. Thus, according to the present disclosure, as the cells 200a provided in the lower region of the first cell region Z1 have the greater thicknesses, the light, which arrives at the central region and the peripheral region of the beam pattern after passing through the first cell region Z1, may move downward.

Figure 6:
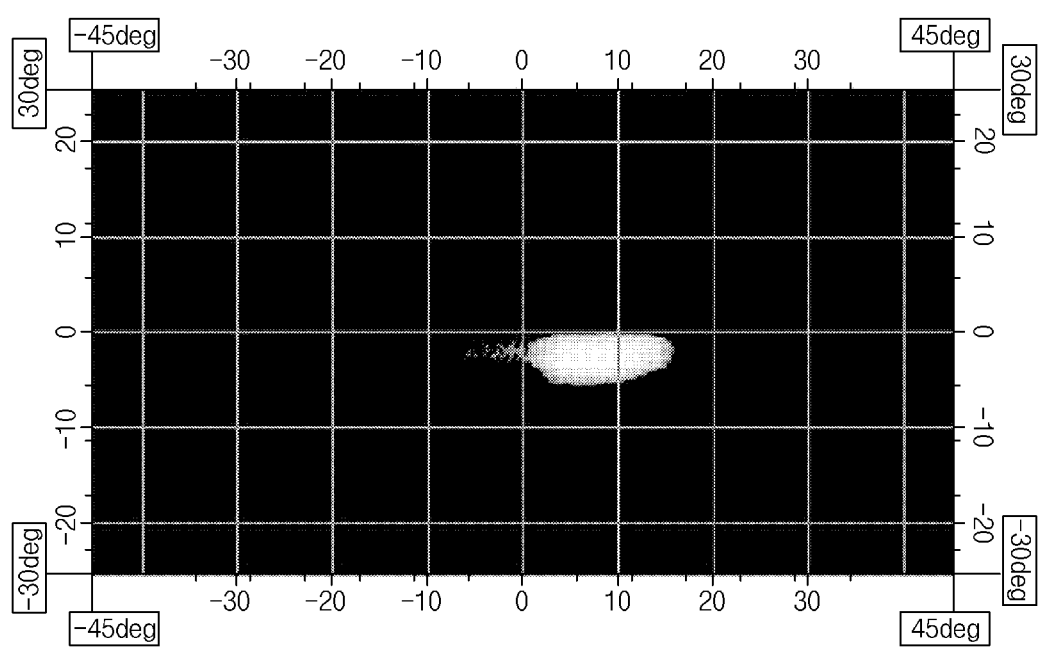
FIG. 6 is a view showing a region of a beam pattern at which light passing through a cell ① among a plurality of cells provided in the lens array of FIG. 2 arrives.
Figure 7:
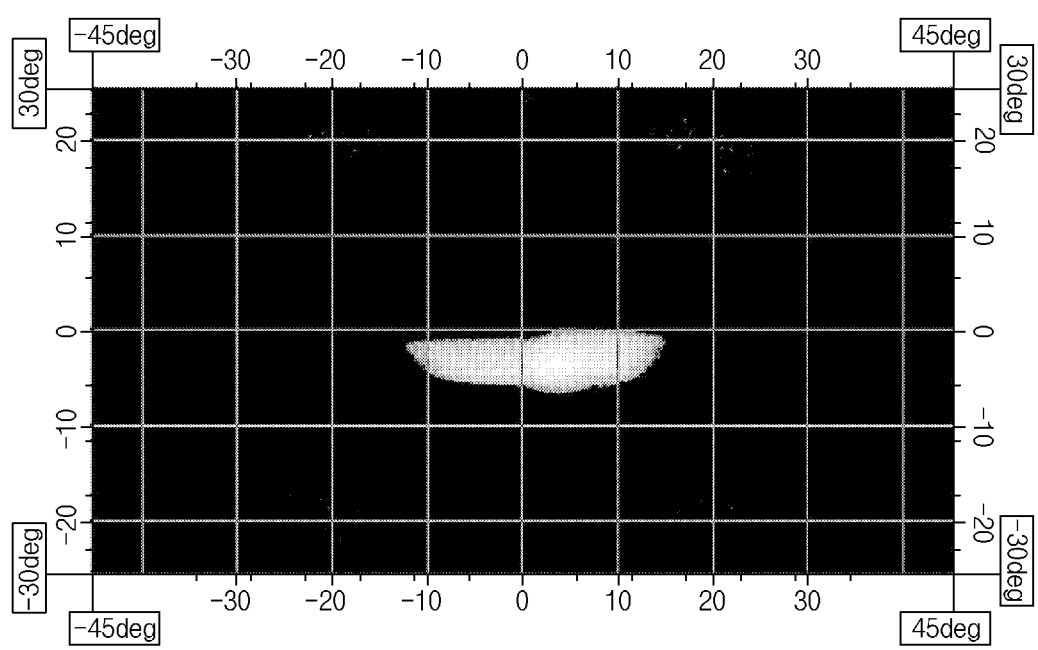
FIG. 7 is a view showing a region of a beam pattern at which light passing through a cell ② among a plurality of cells provided in the lens array of FIG. 2 arrives.
Figure 8:
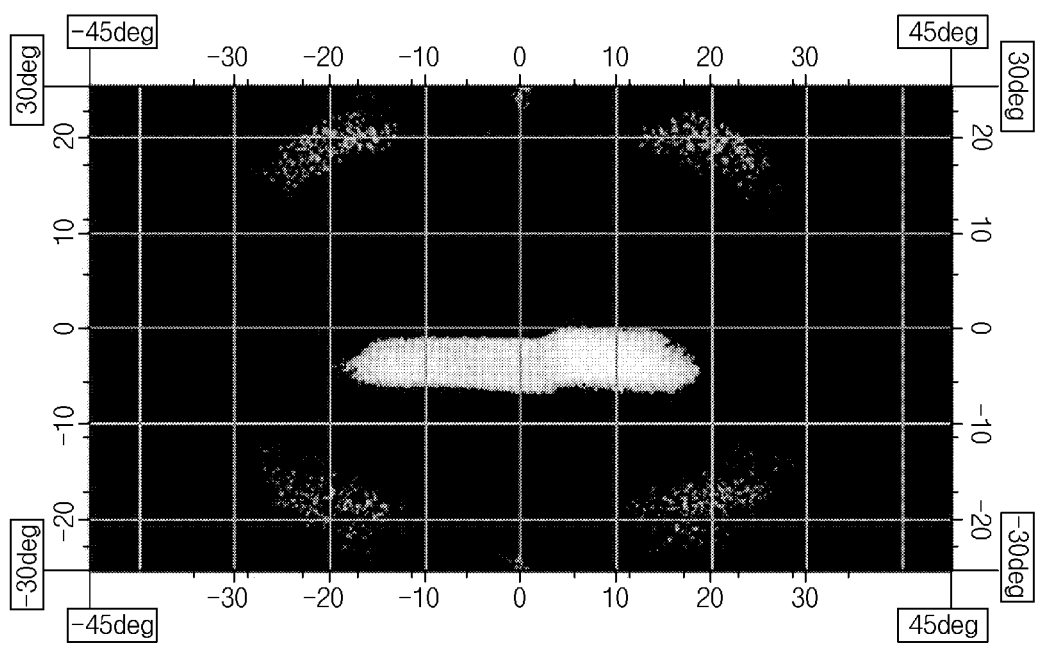
FIG. 8 is a view showing a region of a beam pattern at which light passing through a cell ③ among a plurality of cells provided in the lens array of FIG. 2 arrives.
Figure 9:
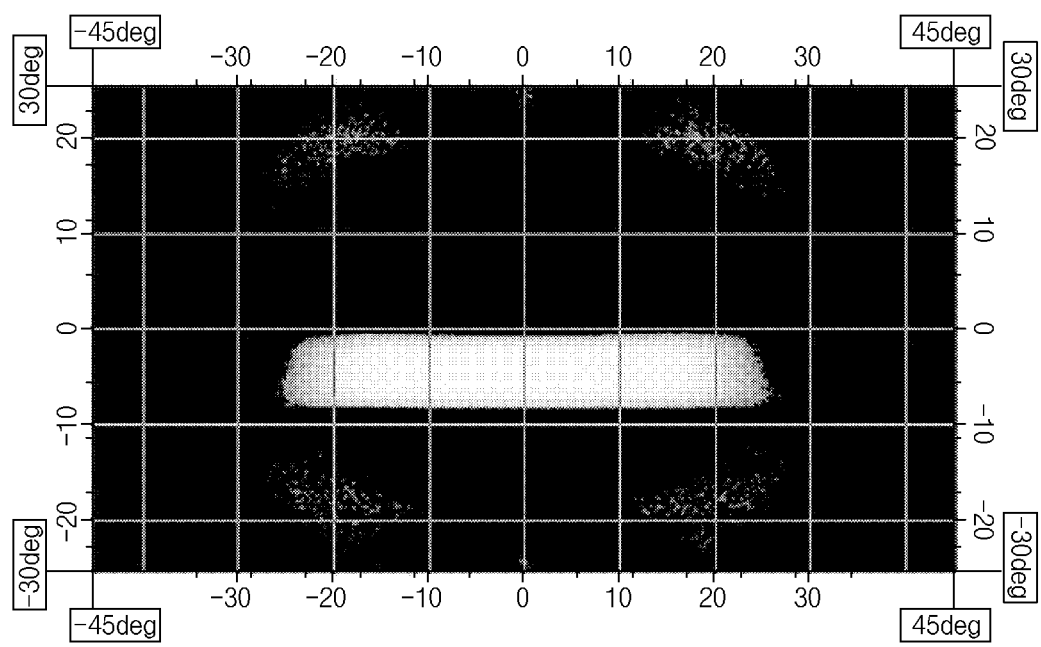
FIG. 9 is a view showing a region of a beam pattern at which light passing through a cell ④ among a plurality of cells provided in the lens array of FIG. 2 arrives.
Figure 10:
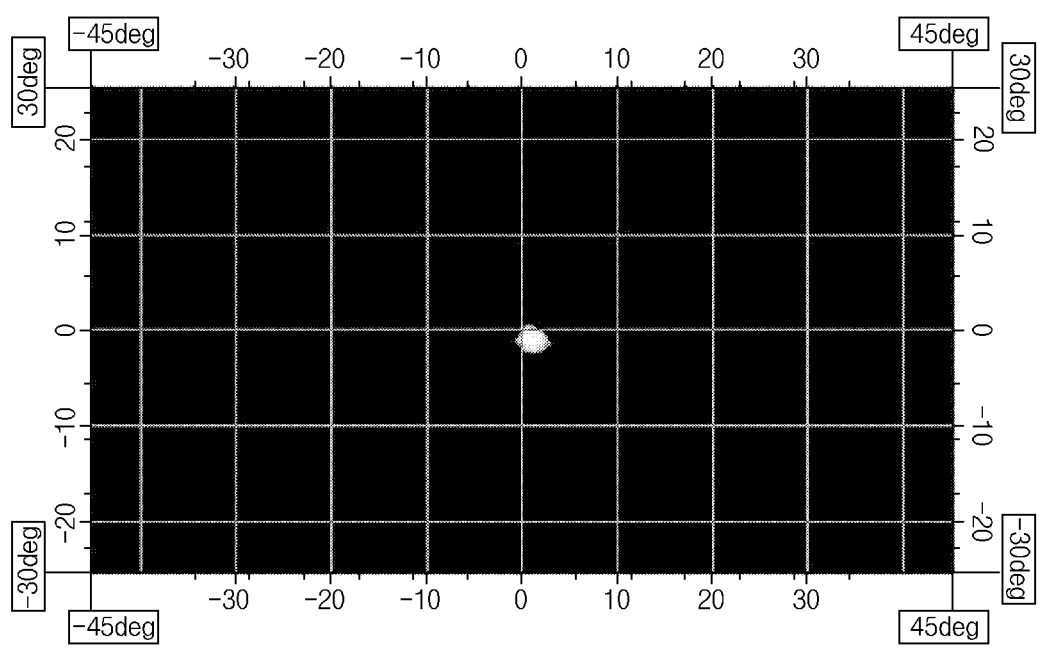
FIG. 10 is a view showing a region of a beam pattern at which light passing through a cell ⑤ among a plurality of cells provided in the lens array of FIG. 2 arrives.
Figure 11:
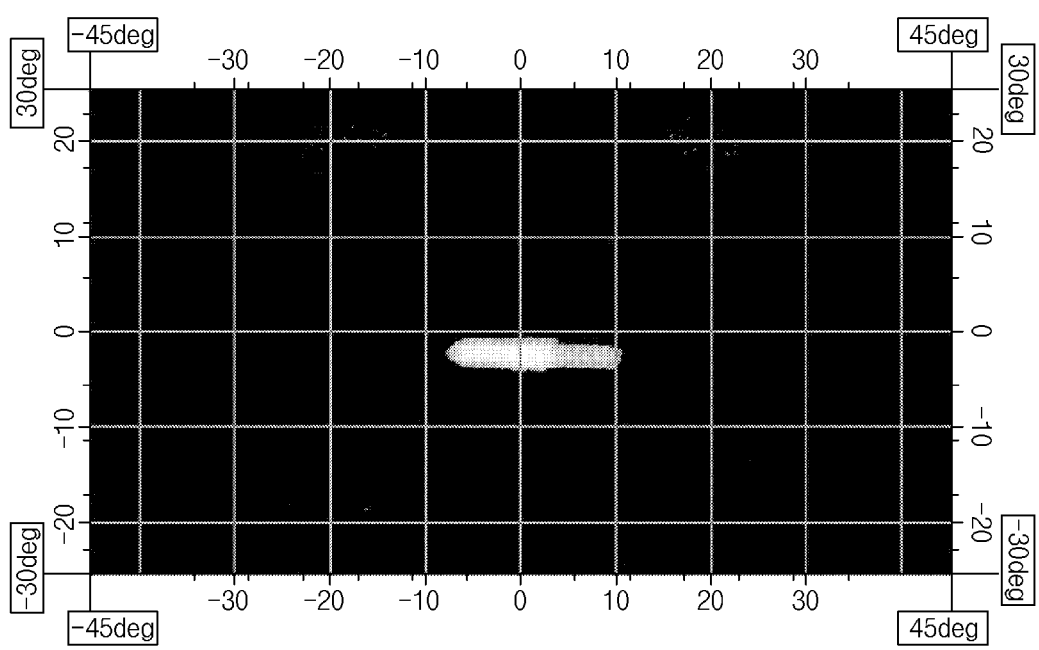
FIG. 11 is a view showing a region of a beam pattern at which light passing through a cell ⑥ among a plurality of cells provided in the lens array of FIG. 2 arrives.
Figure 12:
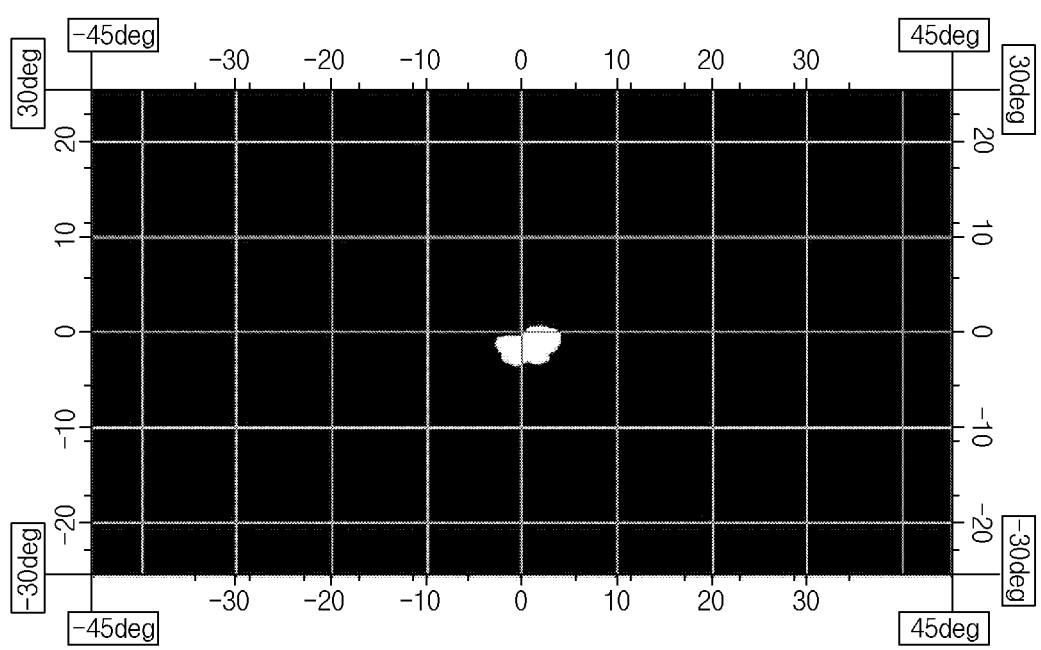
FIG. 12 is a view showing a region of a beam pattern at which light passing through a cell ⑦ among a plurality of cells provided in the lens array of FIG. 2 arrives.
Figure 13:
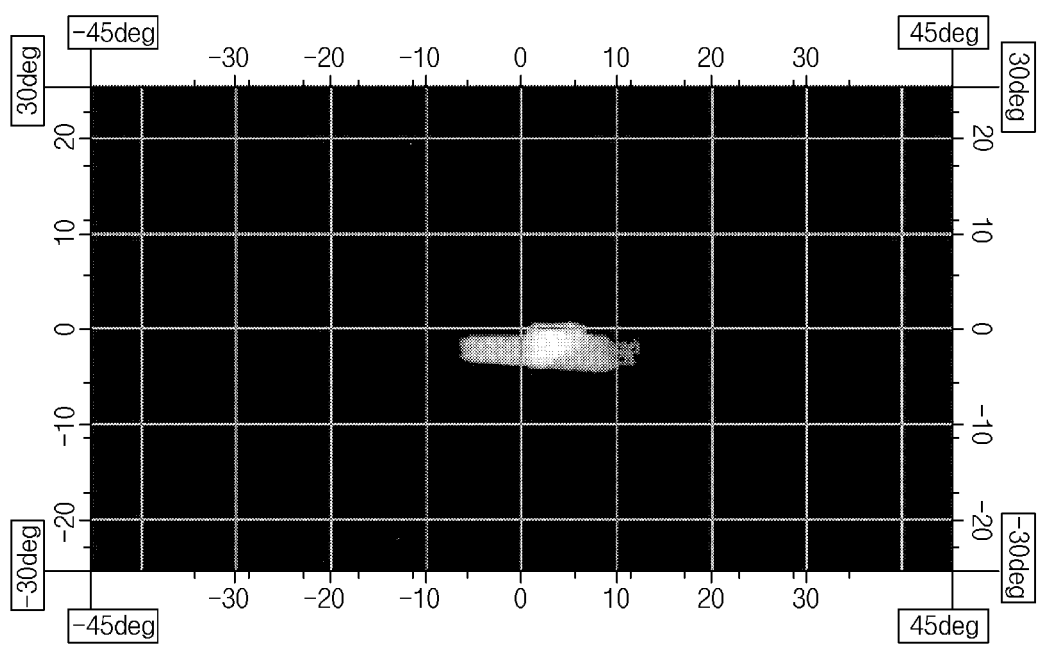
FIG. 13 is a view showing a region of a beam pattern at which light passing through a cell ⑧ among a plurality of cells provided in the lens array of FIG. 2 arrives.

FIG. 6 is a view showing a region of the beam pattern, at which the light passing through a cell ① among the plurality of cells provided in the lens array of FIG. 2 arrives, and FIG. 7 is a view showing a region of the beam pattern, at which the light passing through a cell ② among the plurality of cells provided in the lens array of FIG. 2 arrives. FIG. 8 is a view showing a region of the beam pattern, at which the light passing through a cell ③ among the plurality of cells provided in the lens array of FIG. 2 arrives, and FIG. 9 is a view showing a region of the beam pattern, at which the light passing through a cell ④ among the plurality of cells provided in the lens array of FIG. 2 arrives. FIG. 10 is a view showing a region of the beam pattern, at which the light passing through a cell ⑤ among the plurality of cells provided in the lens array of FIG. 2 arrives, and FIG. 11 is a view showing a region of the beam pattern, at which the light passing through a cell ⑥ among the plurality of cells provided in the lens array of FIG. 2 arrives. FIG. 12 is a view showing a region of the beam pattern, at which the light passing through a cell ⑦ among the plurality of cells provided in the lens array of FIG. 2 arrives, and FIG. 13 is a view showing a region of the beam pattern, at which the light passing through a cell ⑧ among the plurality of cells provided in the lens array of FIG. 2 arrives.

As described above, according to the present disclosure, the light emitted externally via the first cell region Z1 may arrive at the central region and the peripheral region of the beam pattern P in the left-right direction W, and the light, emitted externally via the second cell region Z2, among the light may arrive at the central region of the beam pattern P in the left-right direction W.

Here, an area of a region of the beam pattern, at which the light emitted via one of the plurality of cells provided in the first cell region Z1 arrives, may be greater than an area of a region of the beam pattern, at which the light emitted via another one of the plurality of cells provided in the first cell region Z1 arrives.

More specifically, according to the present disclosure, with respect to two arbitrary cells provided at the same height in the up-down direction H among the plurality of cells 200a provided in the first cell region Z1, an area of a region of the beam pattern, at which the light passing through the cell provided relatively close to the center of the lens array 200 in the left-right direction W arrives, may be greater than an area of a region of the beam pattern, at which the light passing through the cell provided relatively away from the center of the lens array 200 in the left-right direction W arrives.

For example, referring to FIGS. 2, 6, and 7, when comparing the cell ① and the cell ② provided at the same height in the up-down direction H among the plurality of cells 200a provided in the first cell region Z1, it may be confirmed that an area of a region of the beam pattern (see FIG. 7), at which the light passing through the cell ② provided relatively close to the center of the lens array 200 arrives, is greater than an area of a region of the beam pattern (see FIG. 6), at which the light passing through the cell ① provided relatively away from the center of the lens array 200 arrives.

Also, for example, referring to FIGS. 2, 8, and 9, when comparing the cell ③ and the cell ④ provided at the same height in the up-down direction H among the plurality of cells 200a provided in the first cell region Z1, it may be confirmed that an area of a region of the beam pattern (see FIG. 9), at which the light passing through the cell ④ provided relatively close to the center of the lens array 200 arrives, is greater than an area of a region of the beam pattern (see FIG. 8), at which the light passing through the cell ③ provided relatively away from the center of the lens array 200 arrives.

Also, according to the present disclosure, with respect to two arbitrary cells provided at the same position in the left-right direction W among the plurality of cells 200a provided in the first cell region Z1, an area of a region of the beam pattern, at which the light passing through the cell provided at a relatively lower position in the up-down direction H arrives, may be greater than an area of a region of the beam pattern, at which the light passing through the cell provided at a relatively higher position in the up-down direction H arrives.

For example, referring to FIGS. 2, 6, and 8, when comparing the cell ① and the cell ③ provided at the same position in the left-right direction W among the plurality of cells 200a provided in the first cell region Z1, it may be confirmed that an area of a region of the beam pattern (see FIG. 8), at which the light passing through the cell ③ provided at a relatively lower position arrives, is greater than an area of a region of the beam pattern (see FIG. 6), at which the light passing through the cell ① provided at a relatively higher position arrives.

Also, for example, referring to FIGS. 2, 7, and 9, when comparing the cell ② and the cell ④ provided at the same position in the left-right direction W among the plurality of cells 200a provided in the first cell region Z1, it may be confirmed that an area of a region of the beam pattern (see FIG. 9), at which the light passing through the cell ④ provided at a relatively lower position arrives, is greater than an area of a region of the beam pattern (see FIG. 7), at which the light passing through the cell ② provided at a relatively higher position arrives.

Also, according to the present disclosure, here, an area of a region of the beam pattern, at which the light emitted via one of the plurality of cells provided in the second cell region Z2 arrives, may be greater than an area of a region of the beam pattern, at which the light emitted via another one of the plurality of cells provided in the second cell region Z2 arrives.

More specifically, according to the present disclosure, with respect to two arbitrary cells provided at the same height in the up-down direction H among the plurality of cells 200a provided in the second cell region Z2, an area of a region of the beam pattern, at which the light passing through the cell provided relatively close to the center of the lens array 200 in the left-right direction W arrives, may be greater than an area of a region of the beam pattern, at which the light passing through the cell provided relatively away from the center of the lens array 200 in the left-right direction W arrives.

For example, referring to FIGS. 2, 10, and 11, when comparing the cell ⑤ and the cell ⑥ provided at the same height in the up-down direction H among the plurality of cells 200a provided in the second cell region Z2, it may be confirmed that an area of a region of the beam pattern (see FIG. 11), at which the light passing through the cell ⑥ provided relatively close to the center of the lens array 200 arrives, is greater than an area of a region of the beam pattern (see FIG. 10), at which the light passing through the cell ⑤ provided relatively away from the center of the lens array 200 arrives.

Also, for example, referring to FIGS. 2, 12, and 13, when comparing the cell ⑦ and the cell ⑧ provided at the same height in the up-down direction H among the plurality of cells 200a provided in the second cell region Z2, it may be confirmed that an area of a region of the beam pattern (see FIG. 13), at which the light passing through the cell ⑧ provided relatively close to the center of the lens array 200 arrives, is greater than an area of a region of the beam pattern (see FIG. 12), at which the light passing through the cell ⑦ provided relatively away from the center of the lens array 200 arrives.

Also, according to the present disclosure, with respect to two arbitrary cells provided at the same position in the left-right direction W among the plurality of cells 200a provided in the second cell region Z2, an area of a region of the beam pattern, at which the light passing through the cell provided at a relatively lower position in the up-down direction H arrives, may be greater than an area of a region of the beam pattern, at which the light passing through the cell provided at a relatively higher position in the up-down direction H arrives.

For example, referring to FIGS. 2, 10, and 12, when comparing the cell ⑤ and the cell ⑦ provided at the same position in the left-right direction W among the plurality of cells 200a provided in the second cell region Z2, it may be confirmed that an area of a region of the beam pattern (see FIG. 12), at which the light passing through the cell ⑦ provided at a relatively lower position arrives, is greater than an area of a region of the beam pattern (see FIG. 10), at which the light passing through the cell ⑤ provided at a relatively higher position arrives.

Automobile

An automobile according to the present disclosure may include a lamp 10 for an automobile (hereinafter referred to as a 'lamp'). Here, the lamp 10 may include a light source generating and emitting light, a collimator 100 provided in front of the light source, and a lens array 200 provided in front of the light source and the collimator 100. The light, which has been emitted from the light source, is emitted externally via the lens array 200 and may form a predetermined beam pattern P (see FIG. 5).

Here, the lens array 200 according to the present disclosure may include a plurality of cells 200a provided in the front region of the lens array 200. Also, the plurality of cells 200a may be integrated with each other, and stepped portions S (see FIGS. 3 and 4) may be formed at boundaries between the plurality of cells 200a.

According to the present disclosure, the productivity and efficiency of the beam pattern may be improved by simplifying the structure of the micro lens array mounted to the automobile when compared to the related art.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A lamp for an automobile, comprising:
a light source configured to generate and emit light; and
a lens array positioned in front of the light source and comprising:
  a plurality of cells; and
  a plurality of stepped portions formed at a plurality of boundaries between the plurality of cells,
wherein the light from the light source is emitted externally through the lens array in a predetermined beam pattern,
wherein the lens array is horizontally divided into a plurality of cell regions which includes:
  a first cell region positioned at a horizontal center of the lens array and continuously extending along an entire vertical length of the lens array; and
  a plurality of second cell regions positioned at both horizontal sides of the first cell region and continuously extending along the entire vertical length of the lens array without vertically overlapping the first cell region,
wherein the plurality of cells includes:
  a plurality of first cells positioned in the first cell region, and configured to externally emit a first portion of the light emitted from the light source to form a horizontal center region and a horizontal peripheral region of the predetermined beam pattern; and
  a plurality of second cells positioned in the second cell regions, and configured to externally emit a second portion of the light emitted from the light source to form the horizontal center region of the predetermined beam pattern,
wherein the first cells in the first cell region have front-to-back thicknesses greater than those of the cells in the second cell region, and
wherein, in the first cell region, the front-to-back thicknesses of the first cells positioned closer to the horizontal center of the lens array are greater than those of the first cells positioned further from the horizontal center of the lens array.

2. The lamp of claim 1, wherein the first cells in a lower portion of the first cell region have the front-to-back thicknesses greater than those of the cells in an upper portion of the first cell region.

3. The lamp of claim 1, wherein the plurality of cells has a quadrangular shape.

4. The lamp of claim 1, wherein the plurality of cells has a rectangular shape.

5. The lamp of claim 1, wherein:
the plurality of first cells comprises first and second unit cells positioned in the first cell region and having the same vertical position, the first unit cell being positioned closer to a horizontal center of the lens array than the second unit cell is positioned,
a first portion of the light emitted externally through the first unit cell forms a first region of the predetermined beam pattern, and
a second portion of the light emitted externally through the second unit cell forms a second region of the predetermined beam pattern smaller than the first region of the predetermined beam pattern.

6. The lamp of claim 1, wherein:
the plurality of first cells comprises first and second unit cells positioned in the first cell region and having the same horizontal position, the first unit cell being positioned lower than the second unit cell is positioned,
a first portion of the light emitted externally through the first unit cell forms a first region of the predetermined beam pattern, and
a second portion of the light emitted externally through the second unit cell forms a second region of the predetermined beam pattern smaller than the first region of the predetermined beam pattern.

7. The lamp of claim 1, wherein:
the plurality of second cells comprises first and second unit cells positioned in the second cell region and having the same vertical position, the first unit cell being positioned closer to a horizontal center of the lens array than the second unit cell is positioned,
a first portion of the light emitted externally through the first unit cell forms a first region of the predetermined beam pattern, and
a second portion of the light emitted externally through the second unit cell forms a second region of the predetermined beam pattern smaller than the first region of the predetermined beam pattern.

8. The lamp of claim 1, wherein:
the plurality of second cells comprises first and second unit cells positioned in the second cell region and having the same horizontal position, the first unit cell being positioned lower than the second unit cell is positioned,
a first portion of the light emitted externally through the first unit cell forms a first region of the predetermined beam pattern, and
a second portion of the light emitted externally through the second unit cell forms a second region of the predetermined beam pattern smaller than the first region of the predetermined beam pattern.

9. The lamp of claim 1, wherein a portion of the light emitted externally through the second cells positioned at both horizontal end portions of the lens array forms an upper boundary region of the predetermined beam pattern.

10. The lamp of claim 1, wherein:
the predetermined beam pattern comprises a low beam pattern, and
an upper boundary region of the low beam pattern has a cut-off shape.

11. An automobile comprising the lamp of claim 1.

* * * * *